United States Patent [19]

Urban

[11] 4,249,644
[45] Feb. 10, 1981

[54] SLACK ADJUSTER

[75] Inventor: John A. Urban, Livonia, Mich.

[73] Assignee: Eaton Corporation, Cleveland, Ohio

[21] Appl. No.: 43,583

[22] Filed: May 29, 1979

[51] Int. Cl.³ .............................................. F16D 65/56
[52] U.S. Cl. .......................... 188/196 D; 188/79.5 K; 192/111 A
[58] Field of Search .................. 188/79.5 K, 196 BA, 188/196 D, 79.5 GE; 192/111 A

[56] References Cited

U.S. PATENT DOCUMENTS

| Re. 26,965 | 10/1970 | Sander et al. | 188/196 BA |
| 3,507,369 | 4/1970 | Oliver | 188/79.5 K X |
| 3,901,357 | 8/1975 | Reitz et al. | 188/79.5 K X |
| 4,071,120 | 1/1978 | Hagin | 188/79.5 K X |

Primary Examiner—Douglas C. Butler
Attorney, Agent, or Firm—R. J. McCloskey; H. D. Gordon

[57] ABSTRACT

An improved slack adjuster (10) of the clearance sensing type for brakes of the type having a running clearance adjustable by controlled rotation of a shaft (52) such as cam (14) actuated brakes. The slack adjuster includes a one-way drive mechanism including a spring clutch (86) wrapped around the ends of a driving shaft (62) and a driven shaft (52) which is adapted to slip when the torque necessary to rotate the driven shaft exceeds a predetermined limit. The surface (138) of the driven shaft under the spring clutch is provided with a deposit (142) of material different from the remainder of the shaft which will improve the wear and/or frictional characteristics of the surface. The improvement comprises providing a shoulder (148) at the end (146) of the surface of the driven shaft closest the driving shaft which has been found to improve the resistance of the deposit to chip and/or separate from the shaft during assembly and/or use.

16 Claims, 14 Drawing Figures

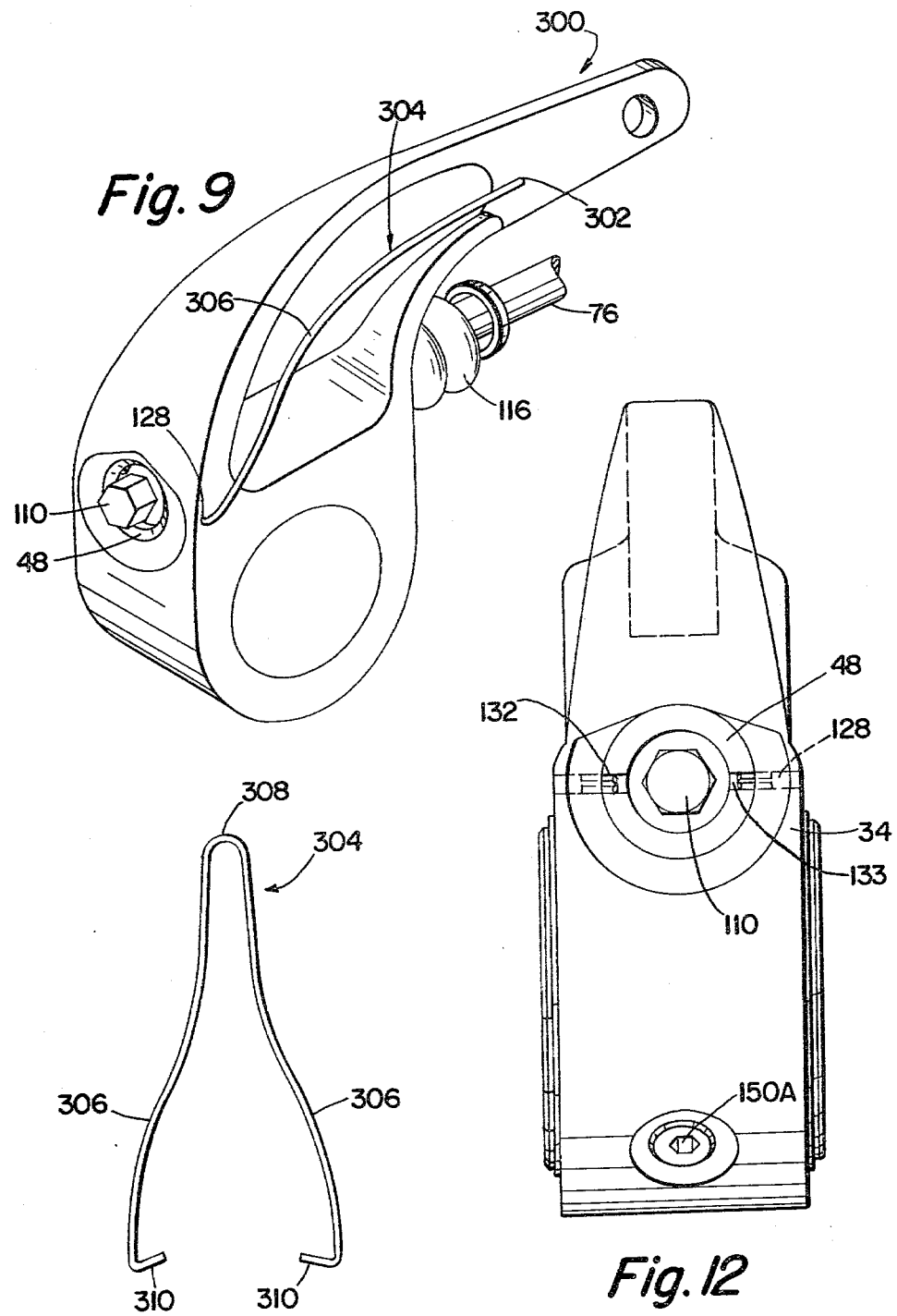

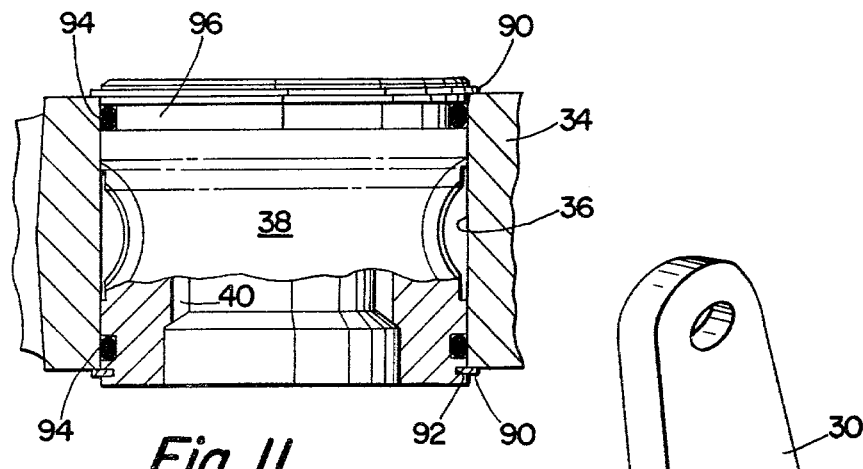
*Fig. 11*
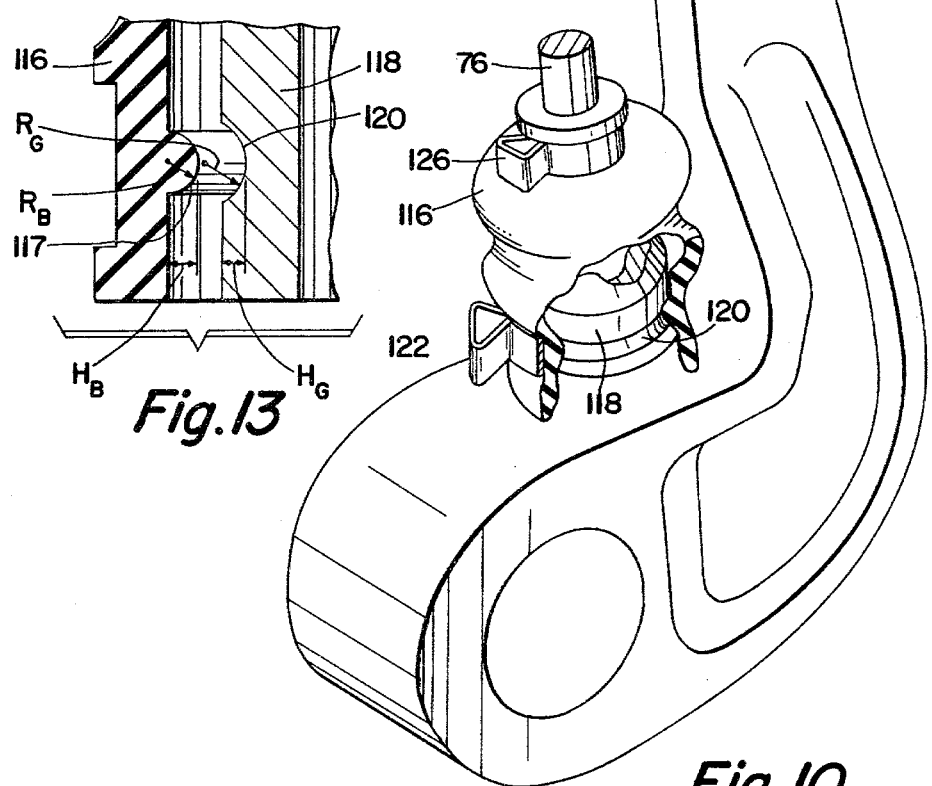
*Fig. 13*
*Fig. 10*

SLACK ADJUSTER

BACKGROUND OF THE INVENTION

1. Field of the Invention

This invention relates to automatic slack adjusters of the clearance sensing type for brakes having a running clearance that may be adjusted by controlled rotation of a shaft, such as for example cam actuated brakes, and in particular relates to clearance sensing slack adjusters for cam actuated brakes of the type utilizing a helically wound spring clutch to transfer torque from a driving shaft to a driven shaft which is in driving relation with the actuating cam and/or utilizing a helically wound spring clutch to resist rotation of the driven shaft. More particularly, the invention relates to the surfaces of the shafts around which the spring clutch is wound, at least one of which is provided with a deposit of material different than the material of the remainder of the shaft, such as a deposit of flame sprayed metallic material, to improve the friction and/or wear characteristics of the surface, the improvement comprising providing a shoulder at the end of the shaft bearing the deposit to resist chipping of the deposit and to provide improved retention of the deposit to the shaft.

2. Description of the Prior Art

Automatic slack adjusters of the clearance sensing type for use in connection with cam actuated brakes are known in the prior art. Several of the automatic slack adjusters of the prior art have utilized a drive mechanism defined in part by a helically wound spring clutch wrapped around two abutting shafts to transfer torque in one direction only from a driving shaft to the driven shaft and to slip when the torque required to move the driven shaft exceeded a predetermined limit. Other slack adjusters have utilized a helically wound spring clutch wrapped around one end of a driven shaft and grounded to a housing to resist rotation of the driven shaft relative to the housing in at least one direction of rotation. Examples of such slack adjusters may be seen by reference to U.S. Pat. Nos. 3,507,369 and 3,901,357. It has been found that to obtain proper wear and functional characteristics between the shafts, which are usually of a suitable steel, and the spring clutch, it was desirable to provide a deposit of a different material, such as a flame sprayed molybdenum alloy, on the surface of at least one of the shafts under the spring clutch. In at least one of the prior art slack adjusters, such a deposit was provided on the surface of the end of the driven shaft abutting the driving shaft. The use of such a surface was found to improve the wear and frictional characteristics of that shaft. However, this was not a totally satisfactory arrangement as the deposit of flame sprayed molybdenum alloy was relatively brittle and tended to crack or chip during assembly and/or use which had a negative effect on the performance of the adjuster.

SUMMARY OF THE INVENTION

In accordance with the present invention, the drawbacks of the prior art have been overcome or minimized by the provision of at least one improved shaft to the extent that the surface of the at least one of the shafts under at least one of the spring clutch is provided with a deposit of material different from the remainder of the shaft, preferably a deposit of flame sprayed molybdenum alloy, which is less likely to chip and/or displays a greater retention to the shaft than the deposits utilized in connection with the prior art devices. The above is accomplished by providing an axially extending shallow groove in the shaft for receipt of the deposit which terminates at a shoulder adjacent the end of the shaft. The deposit and the shoulder are of a substantially equal outer diameter, after final machining, to assure proper operation of the spring clutch. It has been found that in slack adjusters of the type described, it is usually sufficient to provide a deposit on the surface of the driven shaft only and to provide a shoulder on the end of the driven shaft closest to and/or abutting the driving shaft.

Accordingly, it is an object of the present invention to provide an improved automatic slack adjuster of the clearance sensing type for brakes such as cam actuated brakes utilizing a one way torque limited drive mechanism comprising a helically wound spring clutch wrapped around the outer surfaces of two adjacent shafts to transfer torque from a driving shaft to a driven shaft which is in driving relation with the actuating cam or the like wherein a deposit of wear and/or friction characteristic improving material is provided on the surface of at least one of the shafts which is less subject to chipping and/or separation from the shaft than the deposits utilized in connection with prior art adjusters of the same type.

This and other objects and advantages of the present invention will become apparent from a reading of the detailed description of the preferred forms of the invention taken in connection with the attached drawings.

BRIEF DESCRIPTION OF THE DRAWINGS

FIG. 9 is a perspective view of an alternate embodiment of the present invention.

FIG. 9A is a front elevational view of the clip utilized in the embodiment of FIG. 9.

FIG. 10 is a perspective view, partially in section, of the housing and boot assembly of the present invention.

FIG. 11 is a partial sectional view taken along the line 11—11 in FIG. 1.

FIG. 12 is a bottom view of an alternate embodiment of the present invention.

FIG. 13 is an enlarged, partial exploded view in section of the boot and the housing projection.

DESCRIPTION OF THE PREFERRED EMBODIMENTS

Figure 1:
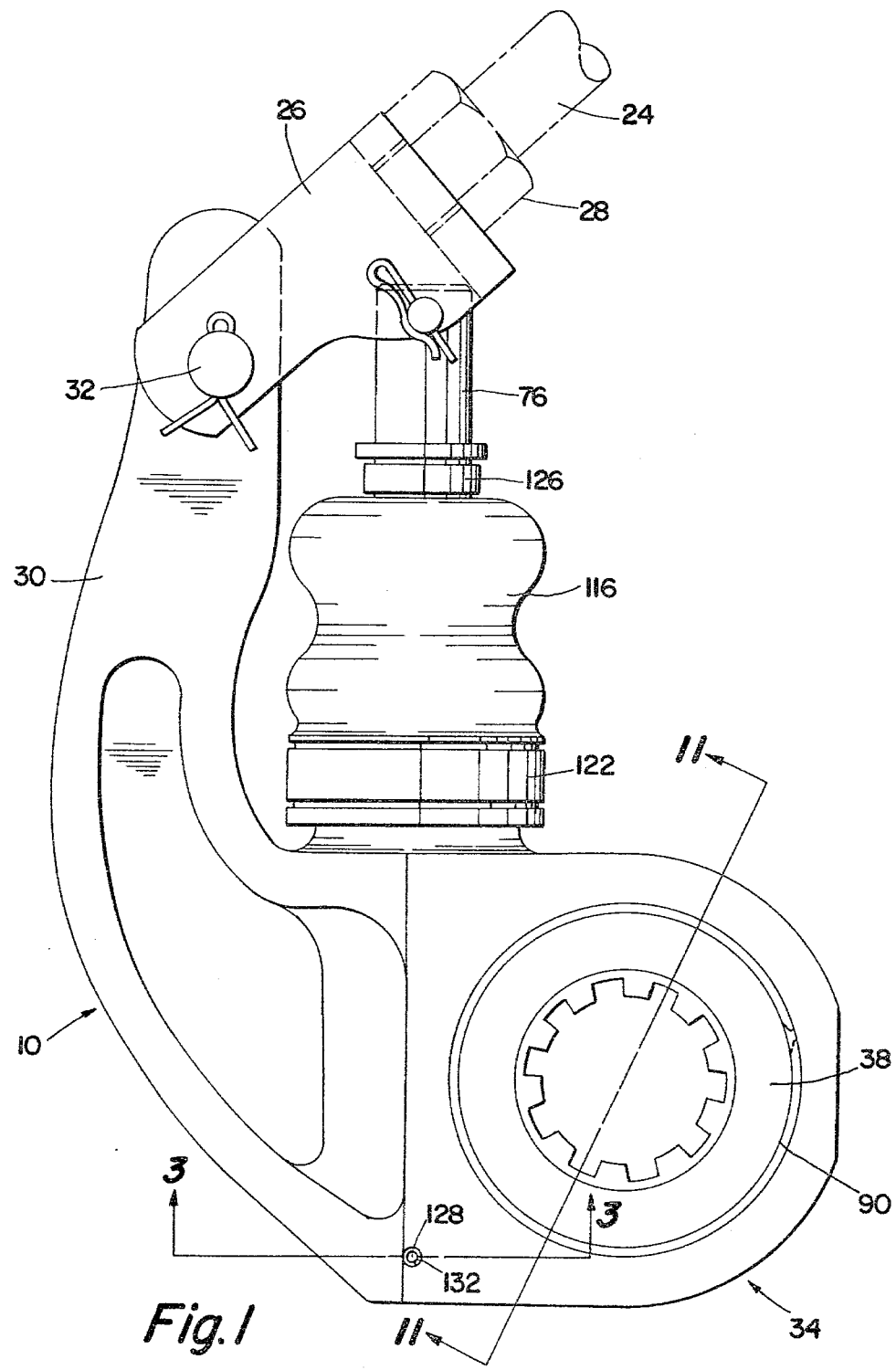
FIG. 1 is a front elevational view of the automatic slack adjuster of the present invention.

Certain terminology will be used in the following description for convenience in reference only and will not be limiti ng. The words "upwardly," "downwardly," "rightwardly" and "leftwardly" will designate directions in the drawings to which reference is made. The words "inwardly" and "outwardly" will refer to directions toward and away from, respectively, the geometric center of the device and designated parts thereof. Said terminology will include the words above specifically mentioned, derivatives thereof and words of similar import.

The improved slack adjuster 10 of the present invention may be seen generally by reference to FIGS. 1-13. The improved slack adjuster of the present invention may be adapted for use with brakes having a running clearance that may be selectively adjusted by controlled rotation of a shaft. As may be seen by reference to FIG. 5, the automatic slack adjuster 10 is particularly adapted for use with a cam brake assembly of the type comprising a brake support member 12 which is adapted to receive and support a brake shoe actuating means 14 which is in the form of an S-cam actuator. The cam 14 is non-rotatably secured to a cam shaft 16 which is supported for rotation in the brake support member 12 by a suitable bearing means (not shown). A pair of outwardly expanding brake shoes 18 abut the brake shoe actuating means 14 in such a manner that upon rotation of the brake shoe actuating means 14, the brake shoes 18 are forced generally outwardly into engagement with a cooperating rotatable brake drum 20. A brake shoe return spring 21 is provided to maintain the shoes in contact with the brake shoe actuating means 14. Secured to the cam shaft 16 is a linkage assembly 11 which is adapted to be driven through an angular displacement by means of a power source, such as an air motor 22. Air motor 22 is of a known construction and is mounted to the support member 12 by a bracket which is not shown.

As is well known in this type of assembly, when the brakes are applied, a pressurized fluid is supplied from a central pressure source (not shown) to a chamber of the air motor 22 and said pressurized fluid causes a spring biased diaphragm in the air motor 22 to move an appropriate force transmitting member 24. The movement of the force transmitting member 24 causes the slack adjuster 10, which is a part of the linkage assembly 11, to be pivoted about the axis of the cam shaft 16 with a resultant rotation of the brake shoe actuating means 14 and the outward displacement of the brake shoes 18 into engagement with the brake drum 20.

As is well known and understood in the art, braking of a vehicle by engagement of the brake shoes 18 with the rotating brake drum 20 causes the lining which is secured to the brake shoes 18 to be worn, thereby increasing the clearance between the brake shoe 18 and the brake drum 20. Uncorrected, this clearance would require an increasing angular rotation of the brake shoe actuating means 14 in order to move the linings into engagement with the brake drum 20. The disadvantages of not correcting for the increasing clearance between the brake shoes 18 and the brake drum 20 are known and include loss of effective stroke in the air motor 22 which requires an increasing amount of pressurized fluid in order to actuate the brake shoes 18.

The linkage assembly 11 includes the automatic slack adjuster 10 of the present invention which is of the clearance sensing type. Clearance sensing type automatic slack adjusters are known in the art and may be appreciated in greater detail by reference to U.S. Pat. Nos. Re.26,965; 3,507,369; 3,901,357 and 4,071,120 all of which are hereby incorporated by reference.

The automatic slack adjuster 10 of the present invention is a mechanism intended to maintain the brake shoes 18 in a proper clearance condition relative to the rotating brake drums 20. The general operation and features of the automatic slack adjuster 10 may be more clearly and adequately defined by referring to FIGS. 2 and 5 of the drawings. The automatic slack adjuster 10 comprises a yoke or a link member 26 which threadably engages the force transmitting member 24. The position of the yoke 26 is fixed with respect to the force transmitting member 24 by a jam nut 28. The yoke 26 is pivotably secured to a lever body 30 by means of a clevis pin 32 which in turn is secured in place by a cotter pin or the like. The lever body 30 is generally L-shaped in plan view and at one end 34 thereof defines a housing and has a generally cylindrical bore 36 therethrough. Located within the bore 36 is a worm gear 38. The worm gear 38 has internal splines 40 and is adapted to cooperate with the externally splined cam shaft 16.

The housing 34 of the lever body 30 further has a bore 42 therethrough, said bore 42 intersecting cylindrical bore 36. The axis of bore 42 is spaced from and generally perpendicular to the axis of bore 36. Located within the bore 42 and restrained against relative axial movement relative thereto is a worm 44. Relative axial movement of the worm 44 relative to the bore 42 is restrained by means of a thrust washer 46 and an end plug 48. The worm 44 is in cooperative engagement with the worm gear 38 and is in driving relationship therewith. The housing 34 of the lever body 30 further defines a generally cylindrical bore 50 adapted to receive and locate a worm shaft 52. The worm shaft 52 is non-rotatably secured to the worm 44 for driving engagement therewith. The worm 44 is fixably attached to the worm shaft 52 by means of a pressed-fit or other suitable attachment means. Of course, worm 44 may be formed integrally with worm shaft 52. The worm bore 50 supports the worm shaft 52 and worm 44 for rotation therein while the thrust washer 46 and end plug 48 prevent axial movement of the worm 44 and the worm shaft 52 while permitting rotation of the worm 44 therein.

The housing 34 of the lever body 30 further defines an enlarged, generally cylindrical bore 54. Bores 42, 50 and 54 are generally coaxial. As can be seen, the worm shaft 52 extends into the cylindrical bore 54. The inner end 56 of the worm shaft 52 extending into the bore 54 has a necked-down portion 58 extending axially further into the cylindrical bore 54. Rotatably mounted on the necked-down portion 58 of the end 56 of the worm shaft 52 and abutting a shoulder 60 thereon is a generally tubular drive member 62. On one end 64 the tubular drive member 62 extends generally radially outwardly from the tubular section 66 and has on the radial periphery thereof a plurality of generally radially extending tooth portions 68. The tubular drive member 62 is axially secured to the worm shaft 52 by means of a suitable fastener 70. Also, partially located within the cylindrical bore 54 and supported by conventional means for relative axial but not rotational movement therein is a generally hollow cylindrical shaped piston member 72 which contains a plurality of internal helical splines 74. The tooth portions 68 of tubular drive member 62 are received in the internal helical splines 74 of piston member 72. The piston member 72 is connected to a rod-like link member 76 at one end 78 thereof by means of a pin 80. The other end 82 of link member 76 is pivotably connected to the yoke 26 by means of a clevis pin 84. Clevis pin 84 is retained in position by means of a cotter pin or hitch pin or the like.

Located at least partially within the cylindrical bore 54 of the lever 30 is a one-way drive mechanism for transmitting rotary motion in one direction only from the tubular drive member 62 to the worm shaft 52. In the embodiment shown, the one-way drive mechanism comprises a helically wound coil spring clutch 86 in wrapped relationship to the sleeve portion 66 of the tubular drive member 62 and the end 56 of the worm shaft 52. Preferably, the outer diameters of sleeve portion 66 and the end 56 of worm shaft 52 are slightly greater than the inner diameter of spring clutch 86 so that a interference fit is established. The one-way drive mechanism spring clutch 86 is located within the cylindrical bore 54 of the lever 30 and fixed against axial movement by an end 88 of the cylindrical bore 54 and the underside of the flanged portion 64 of the tubular drive member 62.

As is well known in the art, helically wound spring clutches have a capacity to transmit a relatively large torque in one direction of rotation and a relatively smaller torque in the other direction of rotation. For example, spring clutch 86 may have a capacity to transmit about 220 inch-pounds of torque from tubular drive member 62 to shaft 52 in the direction of rotation tending to decrease the clearance between shoes 18 and drums 20, but only a capacity to transmit about 20 inch-pounds of torque in the other direction of rotation. Thus, if a means supplying at least 20 inch-pounds of torque tending to resist rotation of shaft 52 in the other direction is present, spring clutch 86 in combination with such means will define a one-way drive mechanism.

As may be seen by reference to FIG. 11, worm gear 38 is axially retained in cylindrical bore 36 of housing 34 of lever body 30 by means of two retaining rings 90 which are retained in generally annular grooves 92 formed at the outer periphery of the worm gear 38 at the two axial ends thereof. To facilitate sealing of the housing 34 of lever body 30, a pair of annular seals, such as O-rings 94, may be received in annular grooves 96 formed in the outer periphery of worm gear 38. Of course, alternate axial retention and/or sealing methods may be utilized.

The other end, 98, of the worm shaft 52 extends into the bore 42 and includes a necked-down portion 100 extending outwardly from the bore 42. A generally annular end plug 48 having a generally cylindrical bore 104 therethrough is removably axially and rotationally fixed to the housing 34 at the opening to bore 42. Necked-down portion 100 of the end 98 of worm shaft 52 is rotationally supported in the cylindrical pilot bore 104 of end plug 48. A generally annular groove 106 is formed on the inner surface of end plug 48 and defines a generally axially extending circumferential surface 108 which is of approximately the same radius as the radius of the non-necked-down portion 98A of end 98 of the worm shaft 52. A helically wound spring clutch 102 is provided in wrapped relationship to the axially extending cylindrical surface 108 and the non-necked-down cylindrical surface 98A of the end 98 of worm shaft 52. Preferably, spring clutch 102 in the relaxed condition has an inner diameter which is slightly smaller than the outer diameter of surface 108 and surface 98A. Spring clutch 102 is wound in the opposite direction than is spring clutch 86. Spring clutch 102, which is grounded to the housing 34, through end plug 48, may have a capacity to resist rotation of worm shaft 52 relative to the housing 34 in the direction tending to increase clearance between the shoes and drum of 100–200 inch-pounds and a capacity to resist rotation of shaft 52 in the direction tending to decrease the clearance between the shoes and the drums of about 15 inch-pounds. Spring clutch 102 will thus provide a significant torque tending to resist rotation of worm shaft 52 in the direction increasing clearance between the shoes and drums while not preventing spring clutch 86 from rotating worm shaft 52 in the direction decreasing clearance between the shoes and drums. The use of oppositely wound helical spring clutches is known in the clearance sensing automatic slack adjuster art and may be appreciated in greater detail by reference to U.S. Pat. No. 3,901,357. The axially outer end 110 of the worm shaft 52 is preferably provided with a hex nut or other appropriate fitting which is adapted to receive an appropriate wrench or other tool so that manual adjustment of the brakes may be effected. Annular sealing members such as O-rings 112 and 114 may be provided for sealing enlarged bore 42.

To provide static sealing of bore 54 and the interior of piston 72, an elastomeric boot member 116 is provided. Lever body 30 is provided with a generally annular projection 118 which defines the outer opening to bore 54. The outer circumferential surface of projection 118 is provided with a generally annular groove 120 spaced axial inwardly from the end of the projection. One end of the boot 116 is snugly received on the outer circumferential surface of projection 118 and will resiliently deform to substantially fill and be retained in groove 120. A clamp 122 is utilized to provide a radially inwardly directed force on the boot and to further deform the boot into the groove 120 to provide an effective seal. The other end of the boot 116 is snugly received on the outer circumferential surface of link 76. An annular groove 124 is provided in the circumferential surface of link 76 and a clamp 126 is provided to maintain an effective seal between boot 116 and the outer circumferential surface of link 76.

Reference to FIGS. 10 and 13 will provide a more detailed understanding of the assembly of the boot 116 to the lever body 30. It is noted that projection 118 is provided with a smooth annular groove 120 about the entire circumferential extension thereof and that the entire outer circumference of projection 118 is relatively smooth and continuous, that is no parting lines or the like are present. Groove 120 is of a height $H_G$ and a radius $R_G$. It has been found that providing such a smooth annular groove around the entire circumferential extension of projection 118, which is smooth and continuous, provides a considerably improved seal between the boot 116 and the lever body 30 than was possible in similar prior art automatic slack adjusters. It has also been found to be much more economical to cast groove 120 on the outer periphery of projection 118 than it would be to machine said groove. This is because machining of the groove would be extremely difficult due to interferences and the like and it would also be extremely difficult to provide a relatively smooth groove as is required to prevent cutting of the boot and the like.

Preferably, the inner surface of boot 116 is provided with a continuous, generally annular, radially inwardly extending bead 117 for cooperation with the groove 120. In the non-deformed condition of boot 116, the height $H_B$ of the bead 117 is greater than the height $H_G$ of the groove 120 and the radius $R_B$ of the bead 117 is less than radius $R_G$ of the groove 120. Thus, when the clamp 122 is utilized to provide a radially inwardly directed force, the compressive force of the clamp is concentrated to deform the bead into the groove to achieve an effective seal therebetween.

Figure 2:
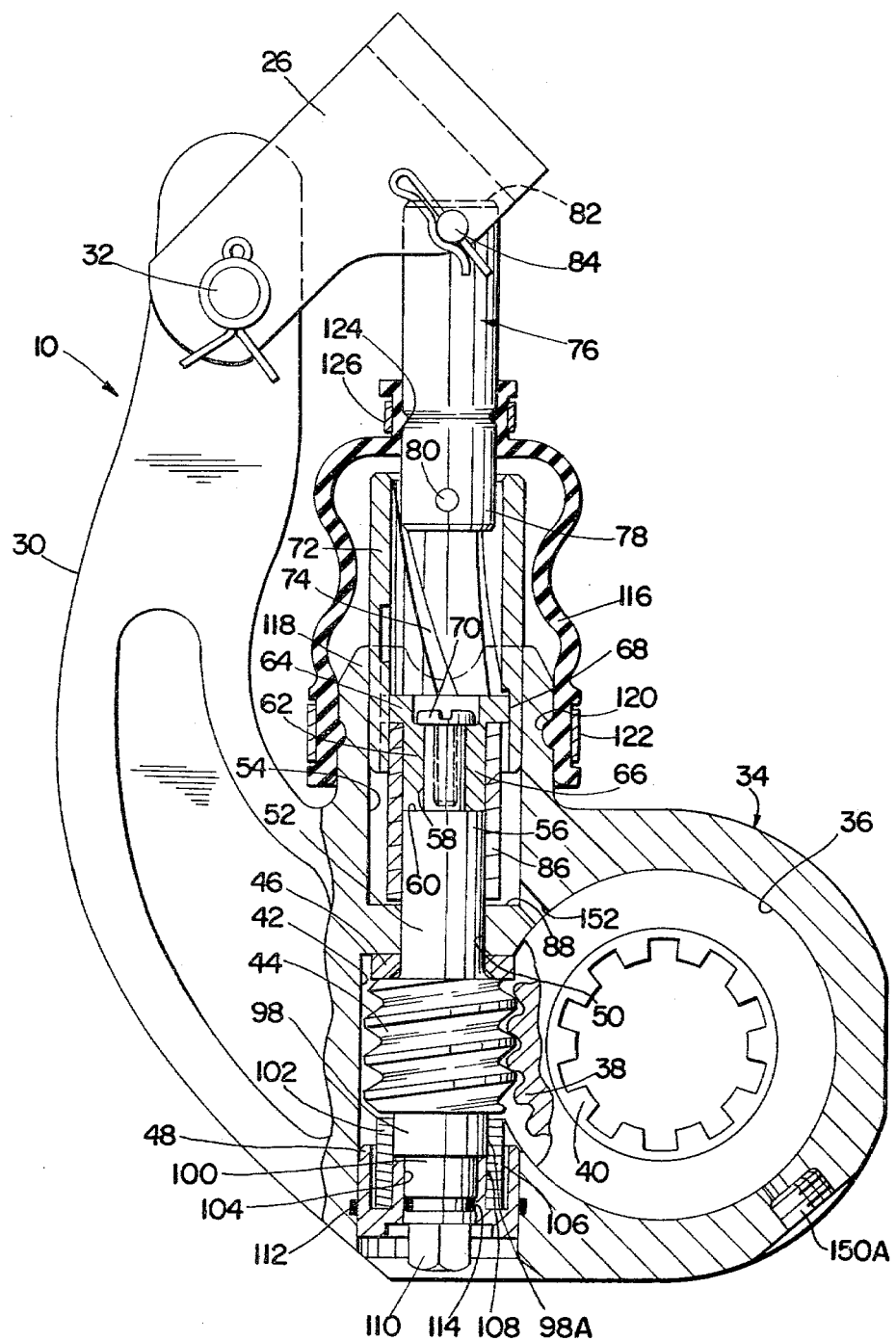
FIG. 2 is a front elevational view, partially in section, of the automatic slack adjuster illustrated in FIG. 1.
Figure 3:
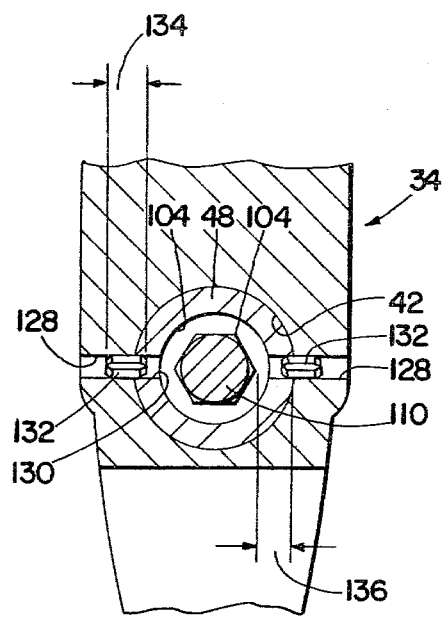
FIG. 3 is a sectional view taken along the line 3—3 in FIG. 1.

The structure for removably axially and rotationally retaining end plug 48 at the outer end of the enlarged bore 42 may be seen in greater detail by reference to FIGS. 2 and 3. End plug 48 seals enlarged bore 42, rotationally supports the end 100 of worm shaft 52, grounds one end of spring clutch 102 and axially positions worm shaft 52 and spring clutch 102. As removal of worm 44, worm shaft 52 and spring clutch 102 from lever body 30 requires the removal of end plug 48, end plug 48 must be removably retained in lever body 30. To this end, housing 34 is provided with at least one bore 128 which extends radially outwardly from cylindrical bore 42 to an outer surface of housing 34. To provide for secure retention of end plug 48, preferably at least two or more generally equally spaced bores 128 are provided in housing 34. End plug 48 is provided with an equal number of radially extending similarly spaced bores 130; bores 128 and 130 being of substantially equal diameter. A plurality of spring pins 132, one for each bore 128, are provided, said spring pins 132 having a non-deformed outer diameter greater than the inner diameter of bores 128 and/or 130. The spring pins, or "roll pins", 132 are of a known construction and are of a generally tubular shape formed from rolled spring steel or the like. The pins 132 have a nondeformed outer diameter which may be resiliently decreased by forcing the pins into a bore having an inner diameter which is smaller than the nondeformed outer diameter of the pins to establish a resilient interference fit between the pins and the bore. The spring pins have an axial length 134 which is less than the radial distance 136 between the outer circumferential surface 104 of the necked-down portion of the end 98 of worm shaft 52 and the inner circumferential surface of enlarged bore 42. To assemble end plug 48 to housing 34, the end plus is inserted into enlarged bore 42 and the end plug is rotationally positioned to align radially extending bores 130 with the radially extending bores 128. The spring pins 132 are then forced into bores 128 resiliently deforming the spring pins 132. The spring pins 132 are forced further radially inwardly until one end thereof is received in bore 130 and the other end thereof is received in bore 128 thereby axially and rotationally fixing the end plug to housing 34. The end plugs will be resiliently retained in this position due to the resilient deformation thereof caused by the difference in diameters between the undeformed pins and the bores. End plug 48 may be provided with generally "U" shaped grooves 133 opening to the axially outer surface of the end plug grooves instead of bores 130 which will ease the alignment thereof with bores 128. The embodiment utilizing "U" shaped grooves 133 may be seen by reference to FIG. 12. To remove end plug 48, spring pins 132 are simply forced radially inwardly until the pins are within bores 130 or grooves 133 and are entirely removed from bores 128 allowing the end plug to be simply and easily removed. The use of the above structure is considered advantageous as it provides a simple and inexpensive method to axially and rotationally removably mount the end plug 48 to housing 34 and further as it provides a simple method for removing and reassembling the end plug to housing 34 for both initial assembly and field servicing purposes. The use of spring pins 132 is considered especially advantageous as compared to the use of threaded fasteners such as screws as the requirement for providing a threaded bore is eliminated as is the instance of thread corrosion which might tend to cause stripping or freezing of the threaded fastener in the threaded bore, especially when said threaded fasteners were exposed to the harsh environment of an automotive vehicle.

Figure 6:
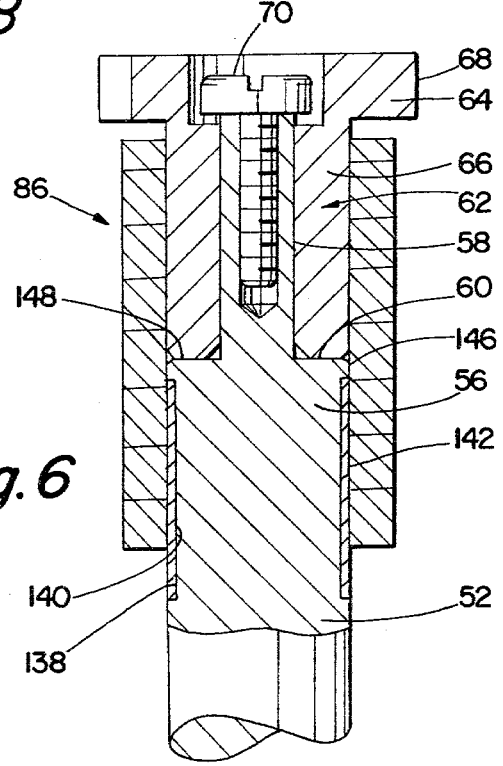
FIG. 6 is an enlarged fragmentary view, partially in section, of the adjusting clutch mechanism of the present invention.
Figure 7:
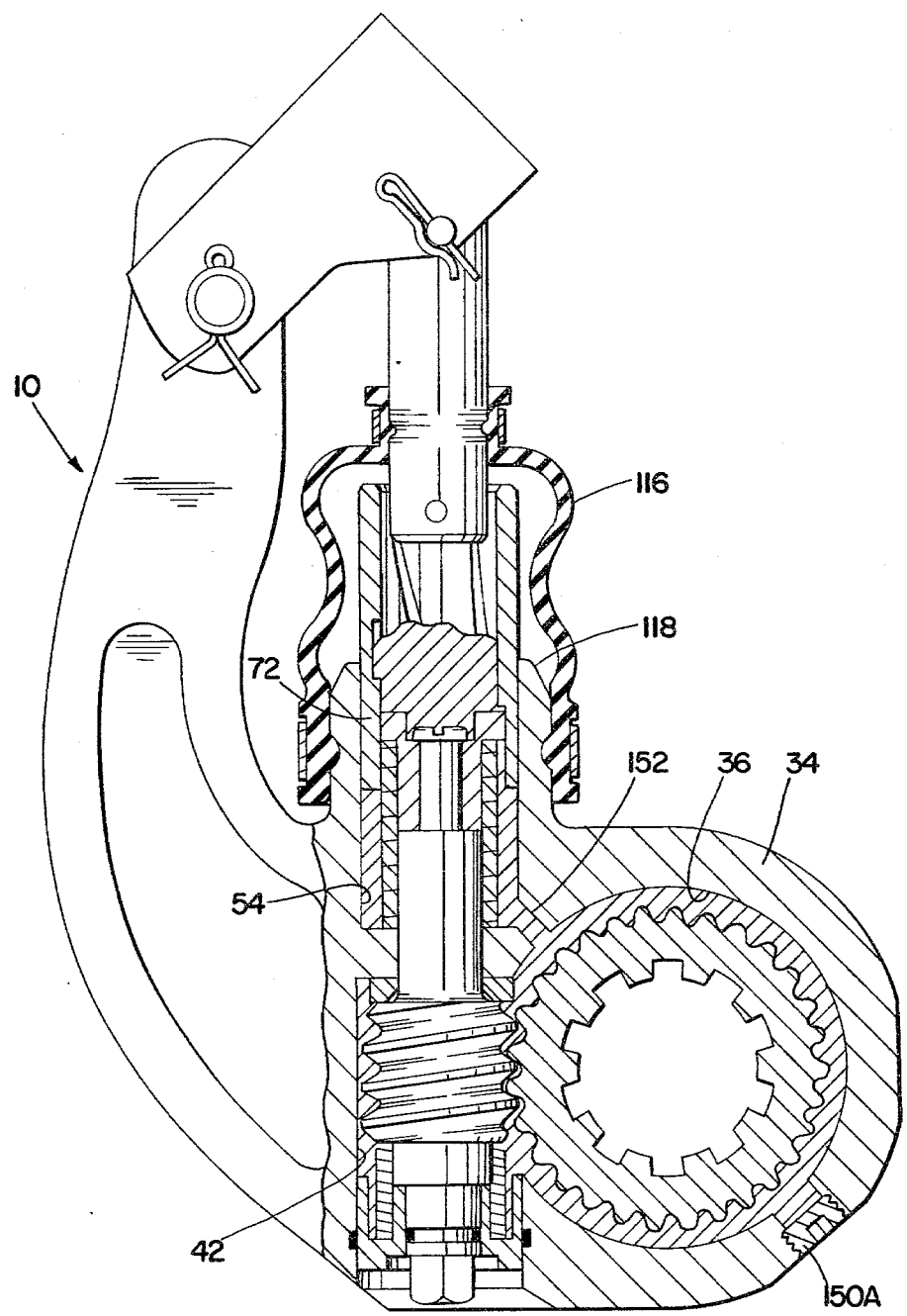
FIG. 7 is a front elevational view, partially in section, illustrating the method of lubricating and leak-testing the automated slack adjuster of the present invention.

The preferred structure of end 56 of worm shaft 52 may be seen by reference to FIG. 6. End 56 of worm shaft 52 comprises a necked-down portion 58 and a non-necked down portion 56. The tubular drive member 62 is rotationally retained on the necked-down portion 58 as has been described above. Helically wound coil spring clutch 86 is wrapped around the outer circumferential surface of the sleeve portion 66 of tubular drive member 62 and the outer circumferential surface 138 of the end 56 of the worm shaft 52. To provide desirable frictional and wear resistance characteristics for surface 138, the surface is flame sprayed with a suitable metallic material, such as molybdenum or a molybdenum alloy. To provide for a sufficient depth of flame sprayed material and to properly retain the flame sprayed material deposit on the outer circumferential surface of the worm shaft a generally shallow annular groove 140 is provided which is filled with the flame sprayed material 142. Although the use of a flame sprayed deposit on the surface of a slack adjuster worm shaft under a helically wound coil spring clutch is highly desirable to provide greater wear resistance and friction characteristics, many flame sprayed deposits such as those of molybdenum are brittle and tended to chip off, especially at the end 146 of surface 138. Such chipping off was highly undesirable as the chips of the flame sprayed material tended to be damaging to the structure and performance of the slack adjuster, especially of spring clutch 86. This was especially true as end 146 of surface 138 tended to received the highest load from spring clutch 86. The deposit of flame sprayed material on prior art devices also tended to be damaged at end 146 and surface 138 during handling and assembly of the spring to the worm shaft. It has been found that chipping of the flame sprayed deposit could be minimized, and further that bonding of the flame sprayed deposit to the shaft 52 could be improved, by the provision of a shoulder 148 at the end 146 of surface 138. Shoulder 148 is of the same outer diameter of the remainder of surface 138. Shoulder 148 also provides support for the deposit 142 of flame sprayed material.

In those embodiments wherein only outer surface 138 is provided with a deposit of wear resistant material, the outer diameter of surface 138 may be slightly smaller than the outer diameter of the surface of tubular drive member 62 around which the spring clutch 86 is wrapped so that the spring clutch 86 will tend to slip on the deposit rather than on the tubular drive member. Alternatively, a greater number of coils may be provided around member 62 than around surface 138.

A similar deposit and shoulder structure could, of course, be provided to surface 108 of end plug 48 and/or surface 98A of worm shaft 52, both of which are surrounded by the retention, or "anti-backoff" spring clutch 102.

Figure 5:
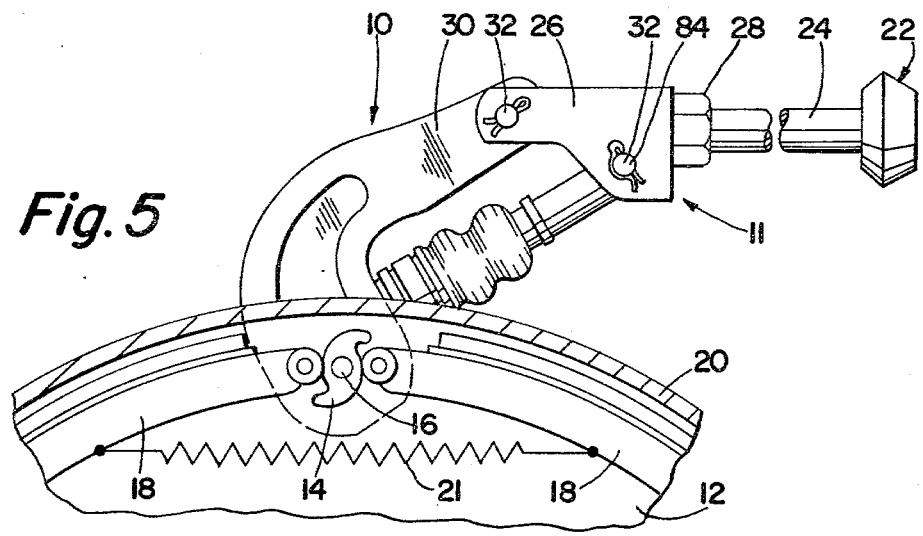
FIG. 5 is a fragmentary plan view of a cam actuated brake assembly with which the automatic slack adjuster of the present invention is particularly adapted for use.

In operation, when the operator of the vehicle actuates the brake system, generally by depressing a pedal, pressurized fluid from a central fluid source is supplied to individual air motors such as that shown at 22 of FIG. 5. When pressurized fluid is supplied to the fluid motor 22, the motion transmitting rod 24 which is attached at one end to the fluid motor 22 and at the other end to the yoke 26 is forced outwardly, to the left in FIG. 5, thereby causing the lever body 30 to be rotated through an arc around the axis of cam shaft 16. This partial rotation of the slack adjuster 10 causes a corresponding rotation of the cam shaft 16 and the brake shoe actuating cam 14. The oppositely disposed brake shoes 18 are forced by the rotation of the cam 14 into engagement with the brake 20. When the lever body 30 of the present invention is caused to rotate in a counter clockwise direction from the position shown in FIG. 5, it will be seen that there is a shortening which occurs between the pivot point of the clevis pin 84 and any point on the tubular drive member 62. The shortening effect is utilized to effect an adjustment of the brake shoe actuating cam 14 in the event that there exists an excess clearance between the brake shoes 18 and the brake drum 20.

As the motion transmitting arm 24 is extended to the left, as is seen in FIGS. 2 and 5, a counter clockwise rotation of the lever body 30 is begun, and the piston member 72 begins to move, because of the above-described shortening effect, axially but not rotationally into the cylindrical bore 54 of the lever 30. Due to the internal helical splines 74 located in the piston member 72 and the mating engagement therewith by the teeth 68 of the tubular drive member 62, a partial rotational movement is imparted to tubular drive member 62. This partial rotational movement of the tubular drive member 62 is transmitted by the one-way torque limiting drive mechanism including spring clutch 86, to the worm shaft 52 and thereon to the worm 44. This rotational movement of the worm 44 likewise imparts a lesser partial rotational movement to the worm gear 38. Since the worm gear 38 is non-rotationally secured to the cam shaft 16, the cam shaft and brake shoe actuating cam 14 secured thereto are likewise given a partial rotational movement with respect to the lever body 30 in response to movement of the piston member 72 into the cylindrical bore 54.

It can be seen, therefore, that during each application of the brakes and the resultant rotation of the lever 30 the piston member 72 will be forced into the cylindrical bore 54 with a resultant rotation imparted to the tubular drive member 62 upon engagement of the helical splines 74 with the teeth 68 of the tubular drive member 62. However, the one way drive mechanism, coil spring clutch 86, provides a torque limiting connection between the tubular drive member 62 and the worm shaft 52. Therefore, rotation of tubular drive member 62 will result in a corresponding rotation of the worm shaft 52 through the one-way drive mechanism 86 only so long as the torque necessary to cause rotation of the worm shaft 52 is below the predetermined limit torque of the one-way drive mechanism. The torque transmitting capability of the torque limiting one-way drive mechanism 86 is sufficient to cause rotation of the worm shaft 52 so long as the brake shoes 18 remain out of firm contact with the brake drums 20. Thus, as the brake shoes 18 are brought into contact with the brake drums 20 the torque necessary to advance the brake shoe actuating means 14 rises with increased travel of the actuating member 24. The highly increased torque necessary to advance the brake shoe actuating means 14 beyond the point where the brake shoes 18 firmly contact the brake drums 20 increases the torque necessary to advance the worm shaft 52 above the torque transmitting capacity of the one-way drive mechanism 86. Therefore, it can be seen that once the brake shoes 18 have been brought into contact with the brake drums 20, the rapid increase in the torque necessary to advance the brake shoe actuating means 14, will increase the torque necessary to rotate the worm shaft 52 above the torque transmitting capacity of the one-way drive mechanism 86 and further rotation of the lever 30 as described above will be result only in the slippage of the one-way drive mechanism 86 with respect to one or the other of the tubular drive member 62 or the worm shaft 52.

The provision of a torque limiting one-way drive mechanism 86 with a limited torque transmitting capability allows for adjustment of the brake shoe actuating means 14 on the brake application stroke and further allows the brake adjusting mechanism to sense brake lining clearance due to wear and make adjustments therefore while distinguishing that brake lining clearance from brake system distortion caused by continued rotation of the brake shoe actuating means 14 due to continued extension of the motion transmitting arm 24 and the resultant continued rotation of the linkage assembly 30 and the cam shaft 16. The use of such a one-way torque limited torque transmitting mechanism, such as coil spring 86, can be appreciated in greater detail by reference to U.S. Pat. No. 3,507,369 and U.S. Pat. No. 3,901,357.

It is, of course, recognized that it is necessary to maintain a predetermined fixed running clearance between the brake shoes 18 and the brake drum 20 in order to allow free running of the vehicle wheels during non-braking operations of vehicle. It is known that frequent usage of the brake will result in increased temperature in the brake drum and brake shoes. This temperature rise will cause a well known thermal diametral expansion of both the brake drum and brake shoes, the expansion under some conditions being greater in the drum. The brake adjuster 10 is therefore designed to adjust only to a corresponding predetermined clearance. This clearance being sufficient to prevent drag of the brake when the brake drum and brake shoes cool and contract to their original diameters. In the slack adjuster 10 of the present invention, this predetermined clearance is maintained by providing a predetermined amount of "lost motion" between the force transmitting member 24 and the tubular drive member 62. That is, a predetermined amount of axial movement of the force transmitting member 24 and/or rotational movement of lever body 30 will occur prior to tubular drive member 62 being caused to rotate by the spline connection between piston 72 and tubular drive member 62. In the present invention, the lost motion is provided principally by the provision of a predetermined amount of clearance or play between the teeth 68 of the tubular drive member 62 and the internal splines 74 of the piston 72. Of course, additional lost motion is provided by the clearances, or backlash, between the link member 76 and the cylindrical piston 72 and the yoke 26.

In adjusters of the type shown, it is, of course, highly desirable to retain the brake shoe actuating member 14 in the desired adjusted position. For this reason, it is very important to prevent undesired rotation of the worm shaft 52. During the brake release stroke, if the tubular drive member 62 has been rotated during the brake application stroke, the tubular drive member will be rotated in the reverse direction. During the reverse rotation of the tubular drive member, clutch 86 will transmit a certain small degree of torque to worm shaft 52. To prevent undesired reverse rotation of worm shaft 52 during the release stroke as a result of spring clutch 86 and/or the exceedingly high forces transmitted through the worm gear to the worm as a result of deformation of the brake drum during a braking operation and/or attributable to other causes, retention coil spring clutch 102 is provided. Retention spring clutch 102 is wound in the opposite direction of coil spring clutch 86 and thus as has been described above, will grip worm shaft 52 to resist rotation thereof with a higher torque in the direction of rotation of worm shaft 52 tending to increase clearance than in the direction of rotation tending to decrease clearance. The torque transmitting capacity, and therefore the torque tending to resist counter rotation of worm shaft 52, of spring clutch 102 is greater than those forces tending to cause an undesired counter rotation of the worm shaft 52. The resistance to rotation of worm shaft 52 in the clearance increasing direction supplied by clutch 102 is not, however, sufficient to prevent manual adjustment of the brakes by means of engaging the hex nut projection 110 of the worm shaft 52. Applicant has discovered that a retention spring clutch 102 having a torque transmitting capacity of about 100-200 inch-pounds in the high torque transmitting direction of rotation is satisfactory for a slack adjuster of the type illustrated. A more detailed explanation of the structure and function of a second one-way coil spring clutch may be had by reference to U.S. Pat. No. 3,901,357. Of course, other types of clutches may be utilized for this purpose as may be seen by reference to U.S. Pat. No. 3,507,369.

Automatic slack adjusters for automotive vehicles operate in an extremely harsh environment, therefore, it is highly desirable that such automatic slack adjusters be provided with structure which will allow for a positive means to insure that the adjuster is adequately lubricated and also to test for the absence of leaks, that is to test for proper sealing thereof. The slack adjuster 10 of the present invention may be positively lubricated and leak tested in the following manner as may be seen more clearly by reference to FIG. 7. A grease fitting 150 (see FIG. 8), which may be replaced by a sealing plug 150A, is provided in housing 34 which communicates with the generally cylindrical bore 36. A passage 152 is provided between cylindrical bore 36 and cylindrical bore 54. To positively lubricate the automatic slack adjuster 10, the automatic slack adjuster is completely assembled except for assembly of piston 72 into the bore 54 and attachment of the boot 116 to the housing projection 118. Lubricant, preferably in the form of a grease, is then introduced under pressure through the lubricant fitting 150 and will fill the cylindrical bore 36, the enlarged bore 42 and will flow around the coil spring clutch 102 and fill the groove 106. The pressurized grease will also flow through passage 152 into bore 54 to surround the spring coil clutch 86. After grease emerges from projection 118, greasing is stopped and the piston 72 is forced into bore 54 to engage the internal splines 74 with the teeth 68 of the tubular drive member. The boot 116 is then assembled to projection 118 by means of clamp 122 as described above. In the preferred embodiment, clamp 126, boot 116, link 76 and piston 72 are preassembled as a subassembly and then assembled to remainder of the adjuster. As the passage 152 provides the path the greatest resistance to the flow of grease, the flow of grease out bore 54 is an accurate indication that the slack adjuster 10 has been properly lubricated. The boot 116 is then attached to the link 76 by means of clamp 126. The use of boot 116 thus provides a static sealing of the housing at the opening to bore 54, as defined by the interior bore 73 of piston 72, as well as allowing a method by which the adjuster 10 can be substantially completely assembled and lubricated prior to sealing of bore 54. Pressurized air is then introduced through fitting 150 while the slack adjuster is held under water. The presence or absence of bubbles will indicate the presence or absence of leaks, respectively, which may be caused by inadequate seals and/or failure to install seals. Of course, other means to test for leaks such as using pressurized gas and testing for pressure drops and/or gas flow may be utilized. After it has been determined that the slack adjuster is properly sealed, the fitting 150 is removed and replaced by a removable sealing plug 150A, and the device is then ready for transmittal to the ultimate user with a positive assurance that it has been adequately lubricated and is adequately sealed.

Figure 8:
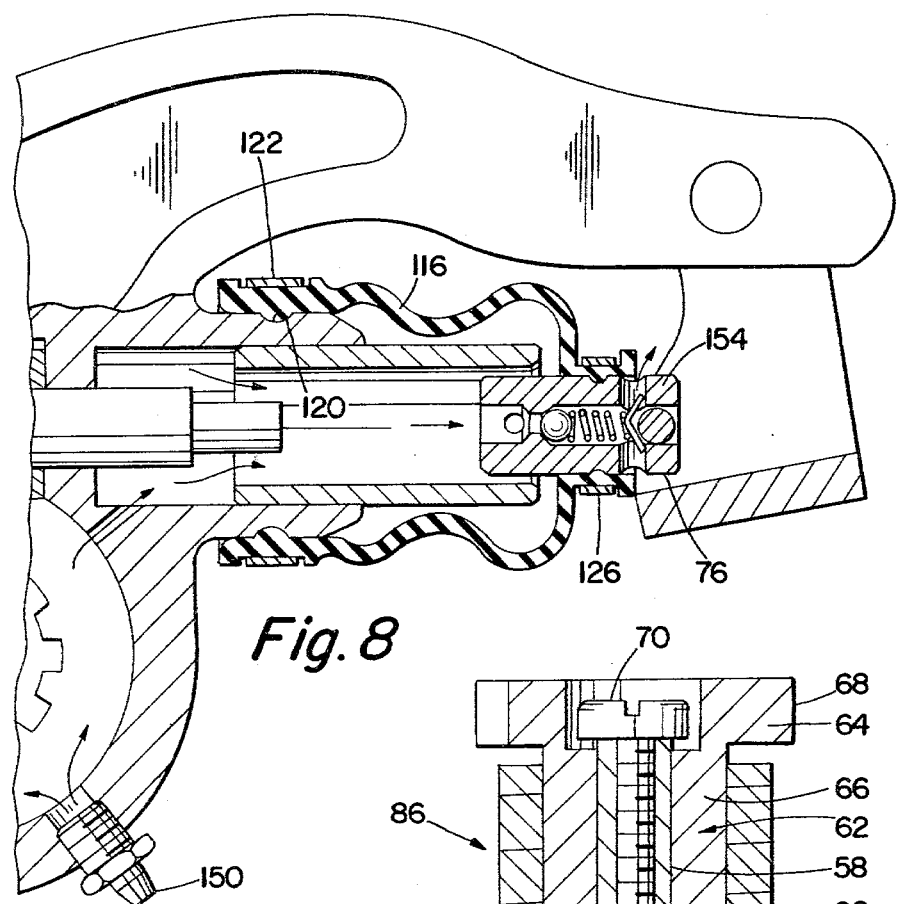
FIG. 8 is a fragmentary view, partially in section, illustrating an alternate embodiment of the present invention.

As may be seen by reference to FIG. 8, a relief valve 154 may be utilized to prevent overlubrication in the field. As lubrication during routine servicing may be expected to occur with the boot fully assemblied to the link, overlubrication will cause the boot to be overexpanded and/or destroyed. Preferably, the grease relief valve 154 which will be of a standard construction, will be located within the link member 76 and will be of a standard one-way construction to prevent contaminants from entering the interior of the slack adjuster as is well known in the relief valve art. The construction of the interior members of relief valve is standard and constitutes no part of the present invention.

Figure 4:
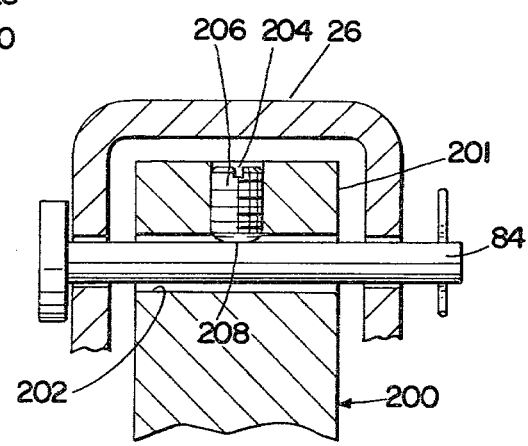
FIG. 4 is an enlarged fragmentary view, partially in section, of an alternate embodiment of the present invention.

An alternate embodiment of the present invention may be seen by reference to FIG. 4. FIG. 4 illustrates an alternate structure for the pivotal connection between the yoke 26 and a modified link 200 which is modified at its outer end 201 only. With the exception of the modifications discussed below, the function and structure of link 200 is identical to that of link 76 discussed previously. As has been discussed above, it is necessary to provide a running clearance between the brake shoes 18 and the brake drum 20. The magnitude of the running clearance is a function of the "lost motion" between the axial force transmitting member 24 with corresponding rotational movement of lever 30 and the application of the rotative force to tubular force transmitting member 62 by the splines 74 of piston 72. In certain situations, it is highly desirable that a simple and inexpensive means be provided whereby the "lost motion" is adjustable. Such situations can arise when new brake linings are installed and it is desired to increase the "lost motion" until such time as the brake linings are worn in and/or to compensate for the use of different friction materials and/or operating conditions. The modifications shown in FIG. 4 achieve such results.

Through bore 202 which receives clevis pin 84 is of a substantially larger inner diameter than the outer diameter of clevis pin 84. This will, or course, provide an additional amount of backlash or clearance between the yoke 26 and the link 200 and thereby increase the "lost motion" in the slack adjuster. An internally threaded bore 204, intercepting bore 202, is provided in the end of the link member 200. A set screw 206 is threadably received in the bore 204. Preferably the threads of screw 206 will be self-lockingly engaged with the threads of bore 204 to assure that screw 206 will remain properly positioned in bore 204. The inner end 208 of set screw 206, which may be of an anti-friction material such as "Teflon", may adjustably extend radially into the bore 202. Under normal operating conditions, the end 208 of set screw 206 will extend into the bore 202 to engage the clevis pin 84 and thereby effectively decrease the effective inner diameter of bore 202 to provide the normal amount of "lost motion" desired when operating with "broken-in" brake linings. However, should it be desired to increase the "lost motion" due to installation new brake linings, or the like, the end 208 of set screw 206 may simply be backed out entirely or partially from bore 202 to provide a larger effective interior diameter of bore 202 and thereby increase the "lost motion" in the system. The same result may be achieved, of course, by utilizing clevis pins 84 of variable outer diameter.

Another alternate embodiment of the present invention may be seen by reference to FIGS. 9 and 9A. The slack adjuster 300 illustrated in FIGS. 9 and 9A is substantially identical to slack adjuster 10 discussed above with the exception of the device utilized to axially and rotationally removably retain end plug 48 in bore 42. As was discussed in reference to slack adjuster 10 above, end plug 48 is provided with two diametrically oppositely spaced radially extending through bores 130, or "U" shaped slots 133, and housing 34 is provided with two diametrically oppositely spaced bores 128, which extend from the exterior of the housing to bore 42. Lever body 30 is further provided with a through bore 302 which is spaced from bores 128. A generally wishbone shaped clip 304, preferably of a spring steel-wire, is provided. Clip 304 comprises a pair of leg portions 306 which are joined at a bight portion 308. The free ends of the leg portions 306 are inturned as at 310. Inturned end portions 310 are of sufficient axial length to extend through bore 128 and into bore 130 or slots 133. In assembly, the clip 304 is threaded through bore 302 such that the bight portion 308 is retained in bore 302. The bores 128 and 130 are brought into alignment and inturned end portions 310 are inserted into the aligned bores, 128 and 130 to removably, axially and rotationally fix the end plug 48 to the bore 42. When removal or assembly of the end plug 48 to the bore 42 is required, the legs 306 are simply resiliently forced outwardly until the inturned end portions 310 pass out of bore 130. Disengagement of the inturned portions 310 from the bores 130 or groove 128 also disengages the retention clutch 102 from housing 34 allowing manual adjustment of worm shaft 52 in the clearance increasing direction of rotation without the requirement of overcoming the 100-200 inch-pounds of resistance to rotation normally provided when clutch 102 is grounded to the housing. During this operation, the clip 304 remains firmly attached to the slack adjuster 300 thereby minimizing the possibility of clip 304 being lost or misplaced. Legs 306 of clip 304 may, of course, be contoured to closely conform with the exterior shape of slack adjuster 300.

Although this invention has been described in its preferred form with a certain degree of particularity, it is understood that the present disclosure of the preferred forms has been made only by way of example and that numerous changes in the details of construction and combination and arrangement of the parts may be resorted to without departing from the spirit and the scope of the invention as hereinafter claimed.

I claim:

1. An improved automatic slack adjuster of the clearance sensing type for brakes of the type having a running clearance adjustable by controlled rotation of a control member, said adjuster utilizing a helically wound spring clutch wrapped around the adjacent ends of a driving shaft and a driven shaft, said control member drivingly engaged with said driven shaft, the outer diameter of said ends being substantially equal, said spring clutch in the relaxed position having an inner diameter slightly less than the outer diameter of said adjacent shaft ends and defining in part a drive mechanism adapted to transfer torque in one direction of rotation only and to slip when the torque required to rotate the second shaft exceeds a predetermined limit, substantially all of the surface of at least one of said shafts under said spring clutch being provided with a deposit of material different from the remainder of the shaft, the improvement comprising:

said one of said shafts being provided with a groove defined by a first generally radially extending wall adjacent the end of said one shaft closest the other shaft and a second generally radially extending wall spaced axially further from said outer shaft, a shoulder defined by said first wall and the end of said one shaft closest said other shaft, said deposit received in said groove and terminating at said shoulder, the outer diameter of said deposit and said shoulder being substantially equal.

2. The improved slack adjuster of claim 1 wherein said one of said shafts is the driven shaft.

3. The improved slack adjuster of claim 2 wherein said driven shaft is of a steel material and said deposit is a molybdenum alloy.

4. The improved slack adjuster of claim 2 or 3 wherein said driven shaft is a worm shaft and said adjuster further comprises a worm gear which is engaged to a worm fixed to said worm shaft.

5. An improved automatic slack adjuster of the clearance sensing type for cam actuated brakes of the type utilizing a first helically wound spring clutch wrapped around the adjacent ends of a driving shaft and a driven worm shaft carrying a worm engaged with a worm gear fixed to the actuating cam, the outer diameter of said ends being substantially equal, said first spring clutch in the relaxed position having an inner diameter slightly less than the outer diameter of said adjacent shaft ends and defining in part a drive mechanism adapted to transfer torque in one direction of rotation only and to slip when the torque required to rotate the second shaft exceeds a predetermined limit, substantially all of the surface of at least one of said shafts under said first spring clutch being provided with a deposit of material different from the remainder of the shaft, the improvement comprising:

said one of said shafts being provided with a groove defined by a first generally radially extending wall adjacent the end of said one shaft closest the other shaft and a second generally radially extending wall spaced axially further from said other shaft, a shoulder defined by said first wall and the end of said one shaft closest said other shaft, said deposit received in said groove and terminating at said shoulder, the outer diameter of said deposit and said shoulder being substantially equal.

6. The improved slack adjuster of claim 5 wherein said one of said shafts is the worm shaft.

7. The improved slack adjuster of claim 6 wherein said driven shaft is of a steel material and said deposit is a molybdenum alloy.

8. The improved slack adjuster of claim 6 wherein the outer diameter of said end of said driving shaft under said first spring clutch is slightly larger than the outer diameter of said worm shaft under said first spring clutch.

9. The improved slack adjuster of claim 6 wherein a greater number of coils of the first spring clutch surround said driving shaft than surround said driven worm shaft.

10. The improved slack adjuster of claim 5 additionally comprising a housing in which said worm shaft is rotatably received, a grounding shaft coaxial with said worm shaft and fixable to said housing and wherein the end of said worm shaft most distant said driving shaft is adjacent an end of said grounding shaft, a second helically wound spring wound opposite said first spring clutch wrapped around the adjacent ends of said worm and grounding shafts to provide a torque tending to resist rotation of said worm shaft relative to said housing.

11. The improved adjuster of claim 10 wherein substantially all of the surface of at least one of said worm shaft and grounding shaft under said second spring clutch is provided with a deposit of material different from the remainder of said shaft, the end of said shaft being shouldered whereby said deposit terminates at said shoulder, the outer diameter of said deposit and said shoulder being substantially equal.

12. An improved automatic slack adjuster for maintaining a preselected running clearance between the friction members of a selectively engageable friction coupling, said slack adjuster including a housing defining in part as linkage between a force transmitting member and a coupling actuating member and including drive means to adjust the coupling actuating member relative to said housing in response to sensed running clearance of the coupling exceeding the preselected running clearance, said drive means including a coaxial driving shaft and driven shaft rotatably received in the housing, said driven shaft engaged with the coupling actuating member, and a helically wound spring clutch wrapped around the adjacent ends of said shafts for transferring torque from said driving shaft to said driven shaft, said spring clutch in the relaxed position having an inner diameter slightly less than the outer diameter of said adjacent shaft ends, substantially all of the surface of at least one of said shafts under said spring clutch being provided with a deposit of material different from the remainder of the shaft, the improvement comprising:

said one of said shafts being provided with a groove defined by a first generally radially extending wall adjacent the end of said one shaft closest the other shaft and a second generally radially extending wall spaced axially further from said other shaft, a shoulder defined by said first wall and the end of said one shaft closest said other shaft, said deposit received in said groove and terminating at said shoulder, the outer diameter of said deposit and said shoulder being substantially equal.

13. The improved slack adjuster of claim 12 wherein said one of said shafts is the driven shaft.

14. The improved slack adjuster of claim 13 wherein the outer diameter of said end of said driving shaft under said spring clutch is slightly larger than the outer diameter of said driven shaft under said first spring clutch.

15. The improved slack adjuster of claim 13 wherein a greater number of coils of the spring clutch surround said driving shaft than surround said driven shaft.

16. The improved slack adjuster of claim 12 wherein said driven shaft is of a steel material and said deposit is a molybdenum alloy.

* * * * *